Sept. 3, 1968  N. J. APPLETON  3,400,387
STROBOSCOPIC DISPLAY DEVICE WITH ROTATABLE DRUM HAVING
CHARACTERS IN STAGGERED COLUMNS Filed Dec. 4, 1964  4 Sheets-Sheet 1

INVENTOR
NORMAN J. APPLETON
BY
Leo R. Reynolds
AGENT

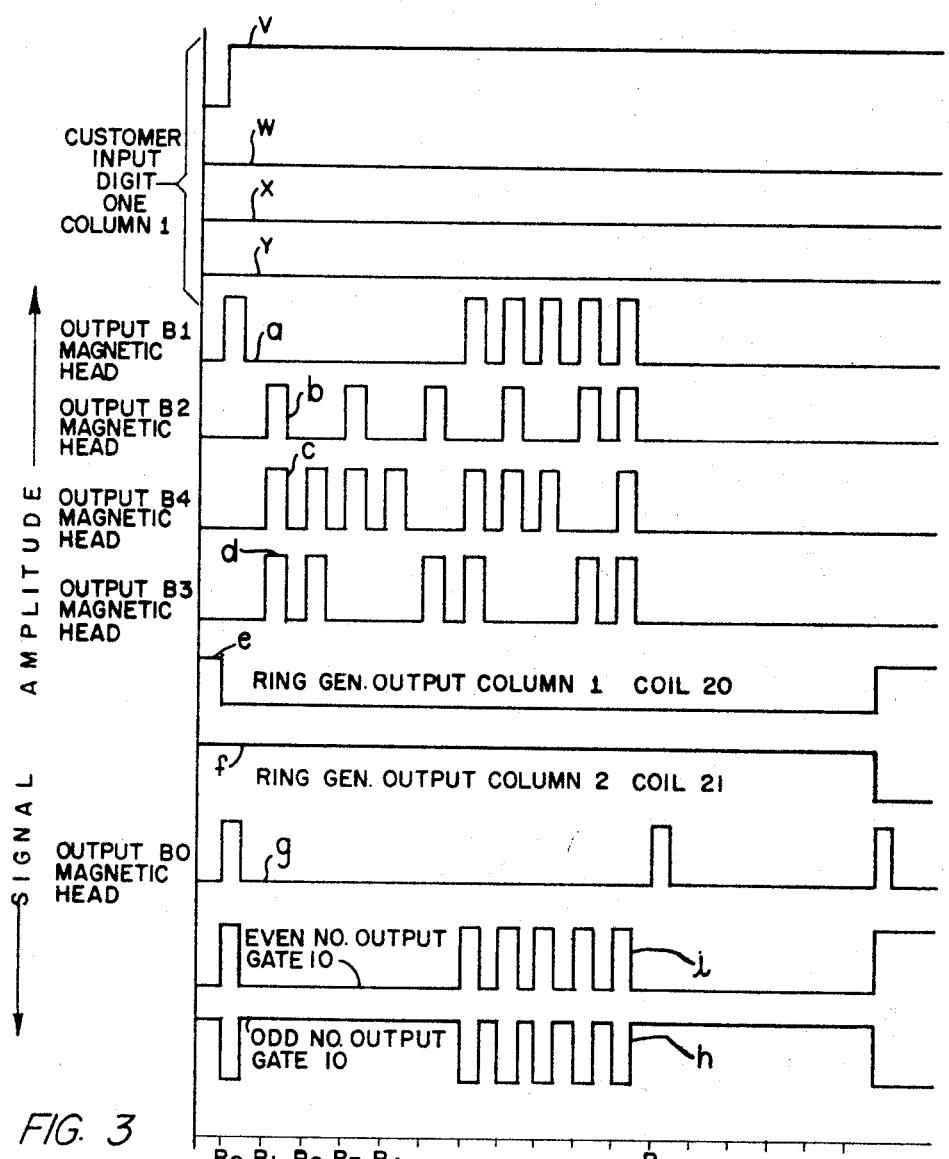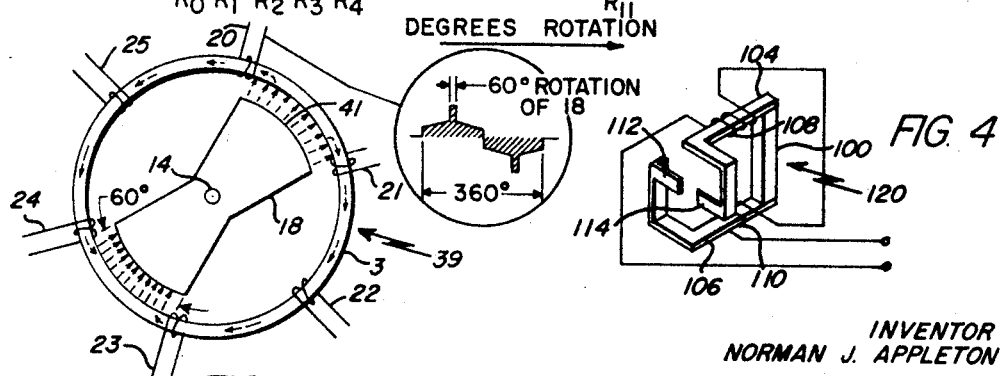

INVENTOR
NORMAN J. APPLETON
BY
AGENT

United States Patent Office 3,400,387
Patented Sept. 3, 1968

3,400,387
STROBOSCOPIC DISPLAY DEVICE WITH RO-
TATABLE DRUM HAVING CHARACTERS IN
STAGGERED COLUMNS
Norman J. Appleton, Hingham, Mass., assignor to
Raytheon Company, Lexington, Mass., a corporation of Delaware
Filed Dec. 4, 1964, Ser. No. 416,043
8 Claims. (Cl. 340—324)

ABSTRACT OF THE DISCLOSURE

A display apparatus for displaying a row of characters corresponding to characters encoded on an input signal which comprises a rotatable cylinder bearing a plurality of sets of readable intelligence units to be read. An intelligence pattern is provided which is movable in coordination with the cylinder, each of the units of intelligence being uniquely represented by a different portion of the intelligence pattern and being positionally related to its representative pattern portion. Finally, means are provided for visually displaying the intelligence units represented by the pattern portion.

---

This invention relates to display means for visually displaying a plurality of characters in accordance with discrete character manifesting signals, and more particularly to the display or recording of intelligence indicia in response to a suitable sending device.

It is often desirable to provide an instantaneous visual indication or display of the intelligence values or characters at the output of, for example, computer, telemetry, telegraphy or telephony equipment in a form that a human operator can read and understand. Various systems have been proposed and are in current use for providing such displays. These displays may be categorized in general as electromechanical, electroluminescent, or cold-cathode glow discharge types. The present invention is related to the electromechanical type and more particularly to the electromechanical stroboscopic type as represented by my U.S. patent, Alpha-Numerical Display Means, No. 3,020,531, issued Feb. 6, 1962.

The stroboscopic display means has an inherent advantage over other display devices in that a single light source, such as a flash tube may be time shared by a plurality of characters or indicia. Due to the persistence of vision, such plurality of indicia will appear to be displayed simultaneously and continuously although illuminated successively and intermittently.

While the stroboscopic display means of my aforementioned Patent No. 3,020,531 is useful for many applications, various disadvantages arise in certain applications due to the complex logic and phasing requirements imposed on the system. For example, in the apparatus of Patent No. 3,020,531 each character to be displayed is not represented by a unique magnetic signal. Instead, the same signal represents any one of the plurality of characters, the time of occurrence of the signal being indicative of the character displayed. Thus, in the apparatus of Patent No. 3,020,531, external logic circuity is required to convert the character manifesting input signal to decimal logic for comparison with the magnetic signals. Furthermore, a separate pickup coil or transducer element is needed for each of the ten characters displayed.

Accordingly, it is an object of the present invention to provide an electromechanical stroboscopic display device having simplified logic and structural requirements.

In the apparatus of the present invention there is provided indicator means for displaying a row of characters corresponding to characters encoded on an input signal and desired to be displayed comprising: a rotatable cylinder having a plurality of staggered columns of character shaped openings arranged about said cylinder; a plurality of character signaling means rotatable in synchronism with said cylinder, each signaling means providing a signal which is uniquely associated with each different character shaped opening; sensing means responsive to said signaling means for providing successive signals corresponding to the coded signal from each signaling means as they rotate past said sensing means; light means for illuminating selected openings in response to an energizing signal; and logic means for comparing the successive signals from said sensing means with the input signal and providing an energizing signal to said light means where a predetermined correspondence occurs therebetween.

Because of the unique association between the coded signal or from the signaling means, the sensing means in a 4 bit binary code system may comprise only 4 pickups, one for each bit in the code, and still have the capability of uniquely displaying up to 16 characters in each column. In addition, separate logic circuits are not required to decode the input character manifesting signals to provide pulses for comparison with the sensed signal.

The characters displayed may be any form of intelligence, for example, letters of the alphabet, numbers, symbols, or other such indicia. The light means is preferably of the stroboscopic type and may, for example, be a flash tube with fast recovery time. The character signaling means preferably comprise patterns of magnetic and nonmagnetic material whose presence or absence can be sensed by a magnetic transducer device, thereby providing a coded signal uniquely representative of the character associated therewith. However, the device is not to be limited to such signaling means inasmuch as it will become apparent that photoelectric or other such means may be readily substituted therefor. While it is not necessary that the signaling means be physically located on the rotatable cylinder, for simplicity and ease in alignment, it is preferable to do so.

Many of the input equipments associated with display devices provide a synchronizing signal in addition to the character manifesting input signals. The synchronizing signal insures that the character column of the input signal and the character column of the displayed character are in synchronism during the logic comparison process. For those equipments which do not provide such synchronizing signal, one way of accomplishing the timing is shown in the aforementioned Patent No. 3,020,531 which requires a complex geared-down mechanical shutter system from which flip-flop circuits are triggered in synchronism therewith to sequentially time the input character signals for each of the non-staggered columns to bring the appropriate character into the viewing area. Should the flip-flops miss a pulse, the whole system loses synchronism.

Accordingly, it is an object of the present invention to provide a simplified timing circuit not dependent on the firing of external pulse mechanisms. To this end, the apparatus of the invention is equipped with timing apparatus comprising: transducer means for providing a plurality of signals of pulse width proportional to the length of each column of openings (including any length associated with dwell space; that is, space at the end of each column to allow for the recovery time of the light means), said signals occurring in time coincidence with the passage of successive columns of openings past said light means, and means for gating successive input signals to the logic means when the successive signals from said transducer means are in time coincidence with corresponding successive input signals.

In a preferred embodiment of the invention, such timing means comprise transducer apparatus consisting of a shaft axially coupled to the aforesaid cylinder. Affixed to the shaft is a magnetic bar having at least one outer arcuate surface forming an arc of length substantially equal to the circumferential length of each column. A fixed iron ring comprising a core is located adjacent said bar, and the bar rotates within it. The ring shape provides a closed high density flux path for magnetic flux to travel from one pole to the magnetic bar to the other pole. Coils, one for each column, are wound around the core at spaced intervals corresponding to the start of each column. These coils are responsive to the rotational position of said bar, since as the bar rotates past the coils, lines of flux cross the wires inducing an E.M.F. in the coils. Thus, each provide a signal of duration equal to the length of one column and at discrete intervals of time corresponding to the rotational location of an associated column. The output signal from each coil is separately coupled to individual AND gate circuits, which gates have for their other input the appropriate column input signals. The AND gates prevent passage of the input signals to successive logic stages except during coincidence with coil output signals.

In the past it has been desired to display more than one character in a predetermined column or columns during each traversal of such column or columns past the light means. For example, when displaying a row of digits it may be advantageous to provide a decimal point in one of the columns next to a digit. In displaying letters of the alphabet, a punctuation mark may be required next to a letter. Owing to the limited recovery time of most light means, to provide illumination of an additional character at the end or start of each column would normally also necessitate an additional dwell space before or after each such additional character. To obviate the additional dwell time, which in some instances may be disadvantageous since it involves a lengthening of the diameter of the aforesaid rotatable cylinder, there is provided in accordance with the invention two additional transparent openings in each column of said character openings, each additional opening having a shape corresponding to the additional character to be displayed, one additional character located at the beginning and the other at the end of each set of openings in a column, and circuit means responsive to the signal condition occurring when the previously illuminated character is either in the upper half or lower half of said column, for energizing said light means in synchronization with only one of said two additional openings.

Preferably, the end additional character is energized when the previously energized character occurs in the upper half of the set and vice-versa when the character occurs in the lower half.

The foregoing and other objects and features of the invention may be more readily understood by reference to the following description of an exemplary embodiment of the invention when read with reference to the drawing in which:

FIG. 3 is a graph plotting amplitude versus rotation of cylinder 2 of FIGS. 2 and 6 showing the idealized waveforms at various points in the circuit diagram of FIG. 6;

FIG. 4 is a perspective view of one of the magnetic head pickups of FIG. 6;

FIG. 5 is a side view of the ring generator apparatus taken along the line 2—2 of FIG. 6;

Figure 1:
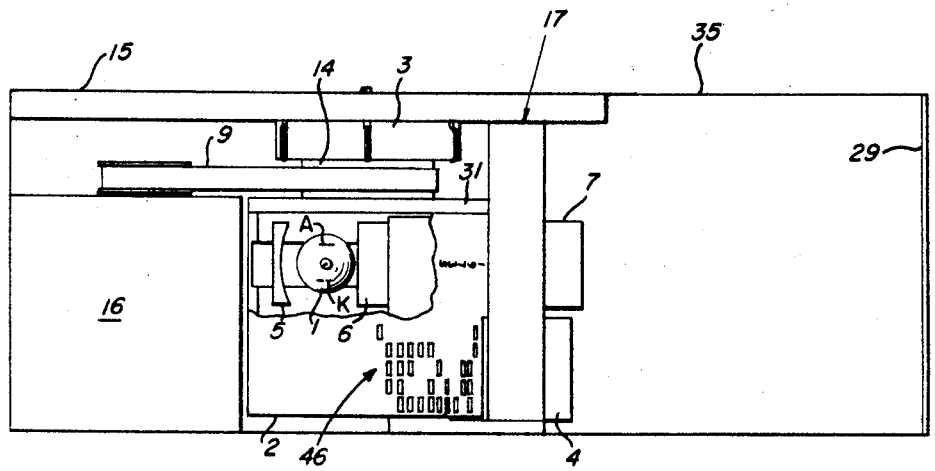
FIG. 1 is a planned view of a preferred embodiment of the invention.
Figure 6:
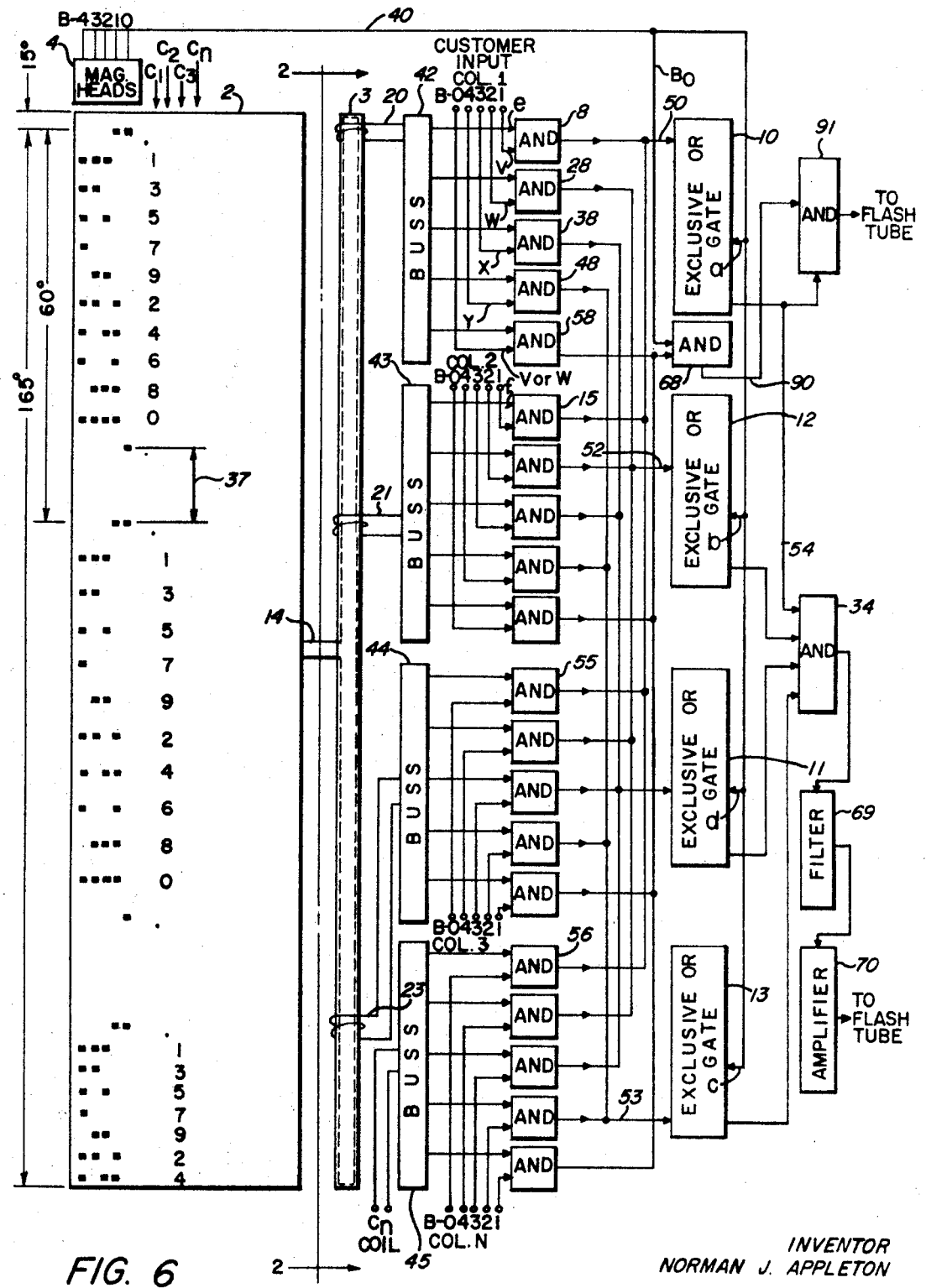
FIG. 6 is a schematic drawing of the apparatus of FIG. 1 in block diagram form.
Figure 8:
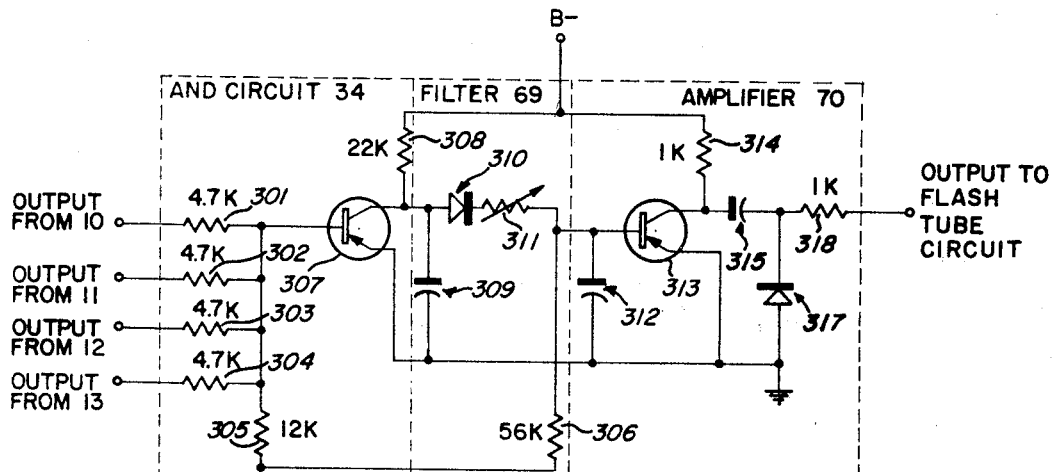
Figure 9:
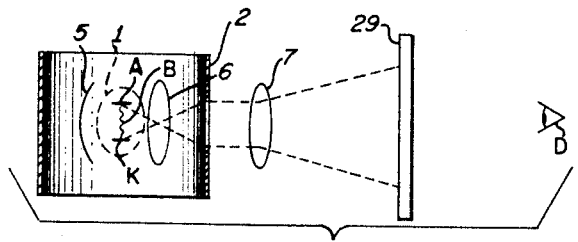

FIG. 8 is a schematic drawing of AND circuit 34, filter 69 and amplifier 70 of FIG. 6; and FIG. 9 is a schematic drawing of the lens apparatus of FIG. 1.

It should be noted that corresponding parts are correspondingly numbered in each of the figures.

Figure 2:
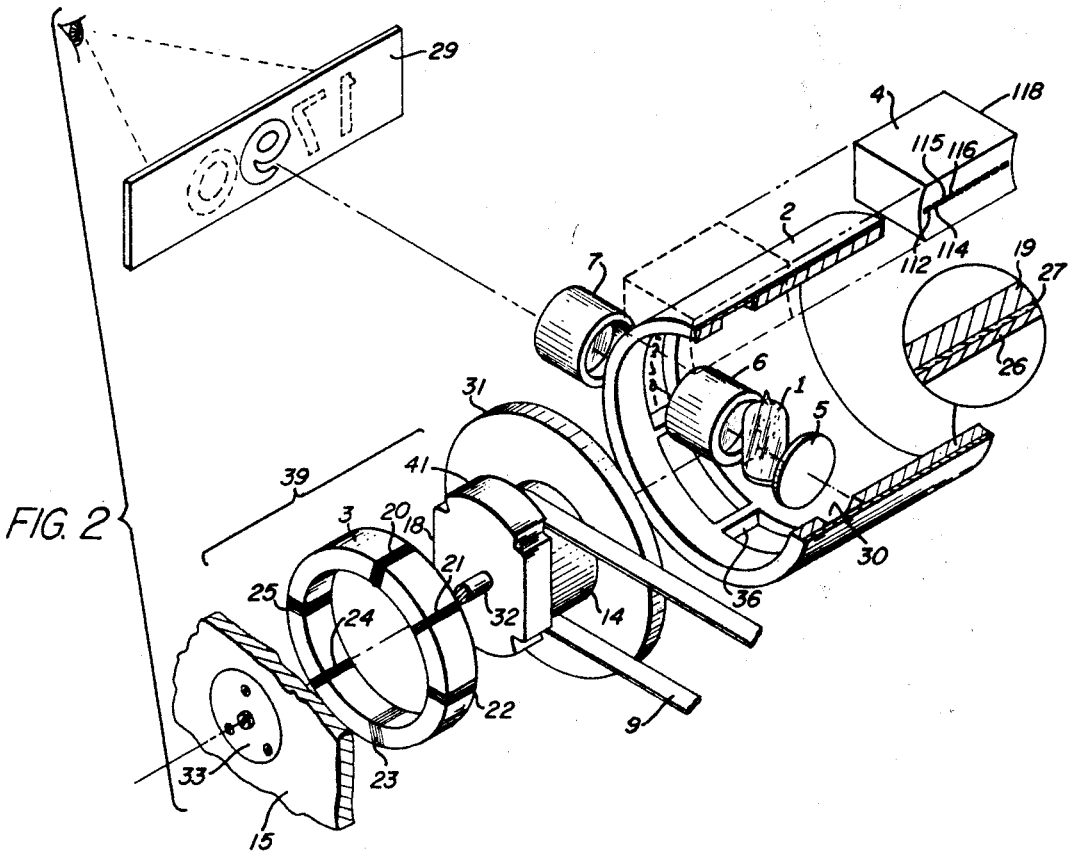
FIG. 2 is an exploded view showing the details of pertinent portions of the embodiment of FIG. 1.

Referring now to FIGS. 1 and 2, there is shown a rotating cylinder 2 consisting of a drum 19 of nonmagnetic material, such as aluminum, upon which is wrapped a sheet comprising thin optically transparent nonferrous material 27, such as clear Mylar, laminated to a base of ferrous material 26, such as iron sheet stock. An aluminum end plate 31 is affixed to one end of cylinder 2. A shaft 14 is affixed to plate 31 and extends outwardly therefrom. Drive motor 16 is coupled to shaft 14 by means of belt 9 whereby cylinder 19 is made to rotate in synchronism with drive motor 16. Magnetic bar 18 is affixed to shaft 14 and a second shaft 32 extends from bar 18 to bearing housing 33 which housing is affixed to support member 15, from which it may be seen that the magnetic bar and cylinder are rotatably mounted in bearing housing 33 and may be rotated in synchronism with drive motor 16. Support member 15 is attached to body frame 35. A housing, not shown, encloses the apparatus of FIG. 1 except for an opening at screen 29.

Prior to wrapping the laminated sheet around drum 19, numbers or other character areas are etched through the ferrous material 26. These characters are arranged in staggered columns so that a line drawn perpendicular to the columns would pass through but one character. When the sheet is wrapped around cylinder 2, a line drawn parallel to the longitudinal axis of the cylinder would pass through but one character.

Drum 19 is undercut to provide slots 30 at the location of the character columns. Ribs 36 are provided for structural support at the ends of each character column. The character areas, consisting of character shaped transparent Mylar openings, permit light from light source 1 to pass to screen 29. Light source 1 is an electron discharge device, such as a stroboscopic flash lamp, having a very fast recovery rate. Included in the lamp in a cathode K and an anode A across which is formed an arc discharge upon receipt at the lamp of a suitable energizing signal.

Light source 1, reflector 5, condensing lens 6, projecting lens 7 and screen 29 from an optical system in alignment with magnetic pickup device 118 and cylinder 2, such that when a row of coded patterns on cylinder 2 is being sensed at magnetic pickup head 118 by the plurality of sensors therein, the corresponding character shaped opening appears intermediate condensing lens 6 and projecting lens 7, vertically centered at the projection of the arc from lamp 1 on the surface of cylinder 2. The projection of the arc from lamp 1 on the surface of cylinder 2 is sufficiently wide so as to encompass the width of all the character column openings. The height of the projection of the arc from lamp 1 onto cylinder 2 is sufficiently high so as to cover one row of openings.

A plurality of signaling means, shown generally at 46, are encoded on the cylinder 2, each such signal means positionally associated with a corresponding column character and each signaling means providing a signal uniquely associated with each different shaped character opening. In the preferred embodiment of FIGS. 1 and 2 the signaling means consists of patterns of bar shaped areas wherein the ferrous material has been etched and removed, the patterns forming the binary coded complement of each respective adjacent number.

Magnetic head device 4 having a plurality of magnetic heads is spaced apart from the cylinder 2 adjacent the patterns and "reads" or senses the information stored on the cylinder as the cylinder is rotated past the magnetic head device 4 at a speed, for example, in excess of 1800 r.p.m. Magnetic head device 4 is supported by support member 17, which in turn is affixed to body frame 35. Individual magnetic heads sensitive to change in reluctance are contained in device 4, each head adjacent a respective column of signaling means.

Reference is had now to FIG. 6 taken in connection with FIGS. 3 and 5 wherein the details of the character encoding on the drum can be more readily seen. It should be noted that corresponding parts in FIGS. 3, 4, 5 and 6 are correspondingly numbered in accordance with the corresponding parts in FIGS. 1 and 2.

In FIG. 6 it can be seen that there are N columns of character openings on cylinder 2 designated C1, C2, C3 and CN, wherein N is an integer greater than 1. In the embodiment shown the characters consist of the digits 0 through 9, plus two additional character openings corresponding to a decimal point. The additional character openings are located at the beginning and end of each column. A drift space 37 is provided at the end of each column to enable the flash tube 1 to recover before the start of the next column. The odd numbered characters 1–9 occur in one half of each column and the even numbers 2–0 in the remaining half. Adjacent each number are located signaling means which provide signals corresponding to the binary coded complement of the corresponding adjacent number. For example, the digit 1 is represented in binary form by the bit 1 followed by the bits 000.

The bit 1 signaling means is a pattern consisting of a bar shaped area of nonferrous material such as the aforesaid Mylar, which is formed by etching the ferrous shim stock from cylinder 2. For the bit 0, no ferrous material is removed, hence no reluctance change is sensed when this portion of the pattern passes the pickup heads in device 4.

The complement of the digit 1 is the bit 0 followed by bits 111. Accordingly, there is formed four columns of signaling means, each row uniquely representing an adjacent character opening. It should be noted that the provision for the additional decimal point and the corresponding additional column $B_0$ of signaling means will be treated in detail subsequently for purposes of simplicity and clarity.

Magnetic head device 4 having a plurality of magnetic heads B4, B3, B2 and B1, each head sensing change in reluctance caused by the presence or absence of adjacent ferrous material as the drum rotates past the head, provides individual output signals to exclusive OR gates 10, 11, 12 and 13. The voltage output after one stage of amplification and shaping from each magnetic head 4 is shown as voltage curves A, B, C and D of FIG. 3 wherein curve A represents the output of the B1 magnetic head as column 1 passes the head. It should be realized that substantially the same output will appear when column 2 passes the head and so on. The polarity of the original pulses from the magnetic heads are inverted by the one stage of amplification not shown. However, the relative polarity of the input pulses to the Exclusive OR gates is primarily predicated on whether or not the transistors used in the Exclusive OR gate circuits are P-N-P or N-P-N. It should also be noted that the particular Exclusive OR gate circuit shown herein and subsequently described in detail in connection with FIG. 8 is responsive to the leading edge of the pulses from the magnetic head and employs PNP transistors. Accordingly, a second stage of amplification, not shown, inverts the pulses from the head to their original polarity. Curve B represents the output of the B2 head, curve C the B4 head and curve D the B3 head. The output of magnetic heads B1 through 4 are separately coupled through cable 40 to separate Exclusive OR gates. The B1 output is coupled to Exclusive OR gate 10, the B2 head output is coupled to Exclusive OR gate 12, B3 to Exclusive OR gate 11 and B4 to Exclusive OR gate 13. The second input to the Exclusive OR gate circuits is the character manifesting input signals from the computer or other customer input equipment. For a 4 bit system in parallel binary code, the customer input signal would take the form of voltage signals V, W, X and Y of FIG. 3 for the digit 1. For illustrative purposes, let us assume that it is desired to display the digit 1 in column 1 of cylinder 2. The customer input on column 1, lines B1, 2, 3 and 4 will be the voltage inputs shown as curves V, W, X and Y, respectively. These customer inputs are synchronized with the corresponding column 1 on the cylinder by means of a ring generator device 39 of FIGS. 2 and 5, subsequently described and appear in serialized form at input leads 50, 52, 51 and 53, respectively, of Exclusive OR gates 10, 12, 11 and 13, respectively. Thus, for example, under the assumed conditions the input to Exclusive OR gate 10 from lead 50 is the sinal V of FIG. 3. The other input lead to Exclusive OR gate 10 contains signal A of FIG. 3, which represents the output of magnetic head B1 through one passage of column 1 past magnetic head B1. An Exclusive OR gate circuit provides an output signal when one, but not both, positive pulse input signals is present. Accordingly, the output of Exclusive OR gate 10 will be the voltage waveform shown in curve 1 of FIG. 3. Similarly, under the assumed conditions, the output of magnetic head B2 represented by curve B is compared with the voltage waveform W representing bit 2 of the customer input information in Exclusive OR gate 12 and an output is obtained from line 54, which is substantially identical to the waveform of curve B. The outputs of each of the four Exclusive OR gates are separately coupled to AND gate 34. AND gate 34 produces an output signal only when four voltage signals are present at its input simultaneously. By comparing curves A, B, C and D (the magnetic head inputs) with curves V, W, X and Y (the customer input information), respectively, in respective Exclusive OR gates, it becomes apparent that during the time period represented by the scanning of one column on the cylinder there is only one instant wherein an output will be received from all four exclusive OR gates and that instant is when the pulses designated R1 of FIG. 3 occur. It will also be noted that at this instant of time the complementary code for the numeral 1 is passing magnetic head 4. As previously mentioned, the magnetic head, the coded information, and the optical system are aligned so that at the instant the magnetic head picks up the coded information, the corresponding transparent character opening is in the center of the optical viewing area. Accordingly, the output of the AND gate 34 is used to flash the flash tube in the well known manner. In like manner, subsequent customer input information is sampled by the apparatus of the invention and uniquely presented on the screen.

*Timing apparatus*

In order to insure that the character column of the input signal and the character column of the displayed character are in synchronism during the logic comparison process aforementioned, a synchronizing signal is developed in accordance with the invention. In addition, at the same time, the normally parallel encoded customer input signal is serialized in the process now to be described in connection with FIGS. 1 through 6. Synchronizing or timing signals are developed from a ring generator device indicated generally by the numeral 39 in FIGS. 2 and 5. Ring generator 39 generates a plurality of gating signals of pulse width corresponding to the circumferential width of each column scan duration. The ring generator 39 includes a shaft 14 axially coupled to cylinder 2 to which is affixed a magnetic bar 18 having an outer arcuate surface 41 forming an arc of length substantially equal to the circumferential length of each of the columns C1 through CN of character openings on cylinder 2. A nonrotating iron core or ring 3 having a plurality of coils 20–25 encircling it at spaced intervals corresponding to the start of each staggered column of characters is fixedly secured to support member 15. The core 3 provides a high density path for lines of flux, shown in dotted lines, to traverse from one pole of magnet 18 to the other. Magnetic bar 18 rotates within the core. The coils are responsive to the rotational position of the bar, inasmuch as passing of the bar causes an induced E.M.F. in the coil due to the crossing of the flux lines. Each coil provides a voltage signal as shown in the circle of FIG. 5. Only the lower plateau designated "60 degrees of rotation" is utilized as a gating signal. This plateau signal from coil 20 is represented by the voltage waveform of curve E of FIG. 3. The plateau for the output of coil 21 appears on curve F of FIG. 3, from which it may be seen that each of the coils provide gating signals of pulse width proportion to the length of each column of openings (including any length associated with drift space), said signals occurring in time coincidence with the passage of successive columns of openings past light source 1. The gating signal from coil 20 is coupled to each of a plurality of AND gates 8, 28, 38, 48 and 58 by means of bus bar 42. In like manner, each of the coil outputs are coupled to respective sets of AND gates. For simplicity only four of the sets of AND gates are shown. However, it should be understood that N sets of AND gates are required for an N column character presentation. Each set of AND gates includes as many AND gates as there are customer bits. For example, in the 5 bit system shown there are 5 AND gates, 18, 28, 38, 48 and 58, in the set of AND gates coupled to coil 20. The remaining inputs to each of the AND gates 18, 28, 38, 48 and 58 consist of the binary coded parallel bit information from the customer, which for the digit 1, would be the curves V, W, X and Y, respectively, of FIG. 3. The AND gate is a logic circuit which provides an output pulse when two pulses are present simultaneously at its inputs. These pulse inputs may be negative going waves or positive going waves depending on the type of transistors used in the AND circuit. By comparing curve E of FIG. 3 with curves V, W, X and Y, it becomes apparent that the signals represented by curves V, W, X and Y are passed only when a corresponding coincidence exists between such signals and the voltage from ring generator coil 20. This feature of the invention insures that the input signal column information and the displayed character column information are in synchronism during the subsequent logic comparison process. The outputs of each bit 1 AND gate 8, 15, 55 and 56 are electrically tied together and coupled through lead 50 to OR gate 10. Similarly, the bit 2 AND gates and the remaining bit AND gates are coupled together to respective Exclusive OR gates. In this manner, the customer input information is effectively serialized into the Exclusive OR gate logic circuitry.

*Floating decimal point system*

As aforerelated, it is often desired to display more than one character in a predetermined column or columns during each traversal of the column or columns past the light means. For illustration, it may be desirable to provide a decimal point in any of the columns C1 through CN displayed on screen 29. In a preferred embodiment of the invention the additional character is provided by including two additional transparent openings in each column C1 through CN of character openings. Each additional opening has a shape corresponding to the additional character to be displayed, which in this example is a decimal point. As will be subsequently explained, in order to simplify the logic process all the even numbers are located in one half of the column, for example, in the lower half and all the odd numbers in the remaining half of the column. The decimal point opening is etched just prior to the odd numbers and subsequent to the even numbers in each column. When an odd number is flashed on the screen, the even number decimal point will be flashed, and when an even number is flashed on the screen, the odd number decimal is flashed.

When an even number is displayed, the dwell time for the flash tube for the additional character is provided by the spacing required for the five odd numbers. The five even numbers provide the dwell time for the odd number decimal point. For example, assume that the customer input signal specifies that a decimal point be displayed in column 1. This customer input signal will appear on lead $B_0$ of FIG. 6 representing the additional bit of information required to energize the additional character. Also assume, as previously illustrated, that the customer input character manifesting signal specifies that the digit 1 be displayed in column 1. For these conditions the signals to column B—, 1, 2, 3 and 4 will be the voltage inputs to curves V, W, X and Y, respectively, as described previously. An additional signal substantially the same as that of curve V of FIG. 3 will occur at input lead $B_0$ of column 1 to manifest the decimal point character in that column. The signal at $B_0$ of column 1 is coupled to AND gate 58 and upon coincidence with the signal from coil 20 is coupled to a second AND gate 68 which has a second input, the output from magnetic head $B_0$. The output of magnetic head $B_0$ is shown as curve G of FIG. 3. Upon coincidence between the two input signals to AND gate 68 an output signal appears at the output of AND gate 68, on line 90, and is coupled to AND gate 91. The second input to AND gate 91 is the output from Exclusive OR gate 10. Because of the coding system selected and the fact that the odd numbers are located in one half of the column and the even numbers in the remaining half of the column, the output of gate 10 will either be curve I of FIG. 3 or curve H of FIG. 3 depending upon whether an even number or an odd number, respectively, is being displayed in that column. Under the assumed conditions the input to AND gate 91 from Exclusive OR gate 10 will be the voltage waveform of curve H and the other input will be the voltage waveform of curve G of FIG. 3. Comparing curves H and G, it will be seen that two plus pulses or voltage levels occur only at the time designated R11. Coincidence between the two inputs to AND gate 91 occurs therefore only at the instant of time designated R11 when the even number decimal point is presented to the viewing area. Accordingly, the output from AND gate 91, which occurs as such coincidence time, is used to flash the flash tube at the appropriate instant. Comparing output curve I with curve G of FIG. 3 it will be seen that in the case of an even number output signal from gate 10 pulse coincidence occurs at the time $R_0$ and the odd numbered decimal point will be flashed. The 0 bit information in columns 2, 3 and N from the customer equipment is processed in a similar fashion to AND gate 91 and compared with the output from Exclusive OR gate 10. It may thus be seen that in the embodiment shown, the logic circuit is greatly simplified inasmuch as the logic information already available at Exclusive OR gate 10 is utilized to determine which of the additional character openings is illuminated. It should be noted that an additional code bit is required in the $B_1$ character code column adjacent the first decimal point to provide a pulse signal concident with the first pulse of curve i when the other logic conditions are satisfied.

*Logic circuits*

In general the logic circuitry of the invention, and particularly that of FIG. 6 comprising AND gates and Exclusive OR gates, may consist of any of the well known transistor-resistor or transistor-diode combinations for performing such functions as will be apparent to those skilled in the art. For example, such circuits are described in detail in the texts "Transistor Circuit Design" prepared by the Star of Texas Instruments, Incorporated, McGraw-Hill Book Company, Inc., 1963, Chapter 29 or "Digital Computer Principles" by the staff of Burroughs Corporation, McGraw-Hill Book Company, Inc., 1962.

Figure 7:
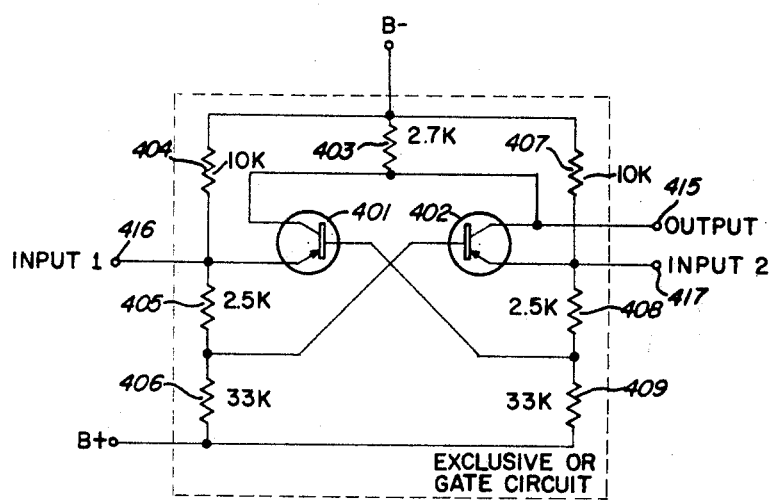
FIG. 7 is a schematic drawing of one of the exclusive OR gate circuits of FIG. 6.

However, for purposes of clarity and completeness a preferred embodiment of one of the four identical Exclusive OR circuits of FIG. 6 is shown in FIG. 7 and described below. Referring now to FIG. 7, there is shown an Exclusive OR gate circuit consisting of a pair of transistors, 401 and 402. The base of transistor 401 is coupled through resistor 408 to the emitter of transistor 402. Likewise, the base of transistor 402 is coupled through resistor 405 to the emitter of transistor 401. The collectors of each transistor are initially set at a negative potential with respect to the bases by means of negative power supply B— which is coupled to said collectors through resistor 403. Initially, both of the transistors are in a nonconducting stage since the bases are set more positive with respect to the emitter by means of voltage source B+, not shown, and the voltage divider networks consisting of resistors 405, 406, 408 and 409.

The Exclusive OR gate circuit has the property previously described, that an input signal to one input terminal 416 or the other 417 will produce an output signal at output terminal 415. However, if an AND condition exists at the input terminals, that is if positive voltage level input signal is present at both input terminals, there will be no output signal at the output terminal, or if a 0 voltage level condition exists at both input terminals, there will be no output. For example, if an input signal is present at 416 then the voltage across the resistor 404 rises, placing the emitter closer to ground potential. In effect, the emitter voltage rises with respect to the base of its transistor and therefore transistor 401 conducts. The base on the opposite transistor 402, which is cross-connected to the emitter of transistor 401, also is placed at a more positive potential, but this has the effect of turning transistor 402 off even more. When transistor 401 is conducting, current passes through load resistor 403 and an output voltage occurs at output lead 415 which is coupled to the intersection of the collector of transistors 401 and 402 and one end of load resistor 403. With no conduction through transistor 403, the output point is essentially at the negative voltage B—. If at the same time an input signal is present at 417, as well as at input terminal 416, then the voltage across resistor 407 also rises placing the emitter of transistor 402 at ground potential. This in turn places the base of the opposite transistor 401 more positive and cuts off conduction through transistor 401. In effect then, the balance condition before either of the input signals appeared returns and there is no conduction through either transistor.

Reference is had now to FIG. 8 wherein the details of a preferred embodiment of an output circuit consisting of AND circuit 34, filter 69 and amplifier 70 of FIG. 6 is shown. The output circuit includes a pair of transistors, 307 and 313, one of which, 307, is normally conducting, and the other of which, 313, is normally nonconducting. The output signals from each of the four Exclusive OR gate circuits of FIG. 6 are separately coupled to one side of respective input resistors 301 through 304. The remaining side of each of the resistors is coupled together to a common point connected to the base of transistor 307 and one side of biasing resistor 305. The remaining side of biasing resistor 305 is coupled to a B+ power supply, not shown. With no positive signal present at, for example, the input lead to resistor 301, that point is tied to the B— power supply through resistor 403 of the Exclusive OR gate circuit of FIG. 7. Each of the remaining input resistors 302, 303 and 304 are similarly connected to B— potential. Under these normal conditions, the base of transistor 307 is biased slightly negative and conducts from the emitter to the collector which is tied to the B— potential through a 2.7K ohm load resistor 308. If a signal from the Exclusive OR gate circuit (FIG. 7) is present at one of the input resistors 301 through 304, then the voltage at the base of transistor 307 rises only slightly because of the remaining three parallel resistors 302, 303 and 304, connected to the B— potential through the 2.7K ohm resistors 403 in each Exclusive OR gate. Accordingly, a signal at only one of the input leads has only a relatively small effect on the voltage at the base of transistor 307. In fact, until all four of the input resistors have signals from the Exclusive OR gates, the voltage at the base of transistor 307 will be sufficiently negative to enable the transistor to conduct. However, as soon as all four signals are present, the full voltage from B+ through 12K ohm resistor 305 is present at the base of transistor 307 and transistor 307 abruptly ceases to conduct.

Transistor 313 is in the output transistor amplifier 70 used to trigger the flash tube circuit. Transistor 313 is normally nonconducting and the negative voltage swing which occurs at the collector of transistor 307 when transistor 307 is cut-off, causes transistor 313 to rapidly conduct producing a fast rise time positive output at the collector of transistor 313. The collector voltage of transistor 307 is connected to the base of transistor 313 through a filtering circuit consisting of bypass capacitor 309, Zener diode 310 and variable resistor 311. As the voltage at the collector of transistor 307 swings rapidly negative upon termination of conduction of transistor 307, the voltage is stored in capacitor 309. The Zener diode in filter 69 prevents this voltage from being coupled to the base of transistor 313 until it reaches a predetermined level. Accordingly, false input pulses to AND gate circuit 34, which could occur from static or other noise, will be prevented from turning the output transistor 313 on and erroneously triggering the flash tube circuit.

Zener diode 310 is biased positive by means of voltage divider network consisting of resistor 306 and variable resistor 311 connected to the B+ power supply. Accordingly, until the negative swing at the collector of transistor 307 overcomes this bias, Zener diode 310 is unable to conduct. However, as soon as the bias is overcome, conduction occurs very rapidly through the Zener diode turning transistor 313 on and providing a fast rise time output pulse at the collector of transistor 313. This pulse is coupled through coupling capacitor 315 and output resistor 318 to the flash tube circuit, not shown. Variable resistor 311 enables the triggering level to be adjusted in accordance with the noise level requirements and compensate for variations in pulse width and phasing due to mechanical tolerances on the code pattern and electrical phase tolerances. Without this feature, a timing pulse would be necessitated. Diode 317 permits fast recharging of the output coupling capacitor 315. Without diode 317 the output coupling capacitor would have to charge through the flash tube circuit which normally employs a silicon control switch having a somewhat slower charging time than is provided by diode 317.

*Magnetic head circuit*

One of the plurality of magnetic heads comprising magnetic head pickup 4 of FIGS. 1 and 2 is shown in FIG. 4 to consist of a permanent magnetic bar 100 comprised, for example, of alnico from which depends a pair of arms 106 and 104, formed from permalloy or the like, around which is wrapped pickup coils 108 and 110, respectively. The coils are wound so as to cancel noise from external fields. Pole pieces 114 and 112 extend from arms 106 and 104. Each of the heads is partially embedded in a dielectric member, not shown. Pole pieces 114 and 112 remain exposed as more clearly shown in FIG. 2, and are located adjacent cylinder 2 in proximity to the signaling means encoded on the cylinder. Thus, as the coded pattern on the cylinder passes the individual heads the reluctance of the path between each pole piece changes in accordance with the signal encoded on the pattern, thereby varying the voltage output of coils 108 and 110 correspondingly. For example, when a nonferrous portion of the cylinder is adjacent the head, between pole pieces 114 and 112, the reluctance of the path across the poles is high, and for a given magnetomotive force from the permanent magnet the flux will be low.

On the other hand, when a ferrous or other high permeability surface of the cylinder 2 is located adjacent and between pole pieces 114 and 112, the reluctance path between the heads will be proportionately lower resulting in greater flux and proportionately large E.M.F. output signals from coils 108 and 110.

The configuration or shape of the individual heads is set to minimize flux leakage and to optimize the rate of change of flux with respect to time as the encoded information on the drum passes by pole pieces 112 and 114. The pole pieces of adjacent magnetic heads embedded in the dielectric member 118 of FIG. 2 are alternated to reduce cross-coupling. For example, if pole piece 112 is a north pole, pole piece 114 is a south pole and pole piece 115 is a north pole to prevent cross-coupling.

*Optical system*

The optical system may be best described in connection with FIG. 9 which is a schematic representation of the structural details of the optical system shown in FIGS. 1 and 2. As can be seen from FIG. 9, lamp 1, including an anode A and a cathode K across which is formed an arc B, is disposed intermediate a reflecting mirror 5 and a condensing lens 6 all of which are nonrotationally disposed within rotating cylinder 2.

The purpose of the reflector 5 is to reflect light from arc B, which would normally be dissipated or wasted going out the back direction of lamp A, or image the light back to the original arc so that the light travels in the direction of condensing lens 6. Condensing lens 6, consisting of plano-convex lens arrangement, focuses light from arc B onto the projection area of cylinder 2, which area has a height equal to the height of one of the character openings and a width equal to the width of N columns of characters. Externally adjacent cylinder 2 and optically aligned with condensing lens 6 is projecting lens 7, which magnifies and projects light passing through the character openings on cylinder 2 onto screen 29 so that the projected character may be viewed by an observer at point D. Inasmuch as only one of the column of characters will appear at any moment in the aperture area, only one character opening is projected onto screen 29 for each flash of flash tube 1. However, due to the high repetition rate of the flash tube circuit and the persistency of vision, the N column of characters will appear to the viewer at D to occur simultaneously.

This completes the description of the preferred embodiments of the invention. However, many modifications thereof will become apparent to those skilled in the art. Accordingly, it is intended that this invention not be limited except as defined by the following claims.

What is claimed is:

1. Indicator means for displaying a row of characters corresponding to characters encoded on an input signal comprising:
   a rotatable opaque cylinder having a plurality of staggered columns of transparent openings arranged circumferentially about said cylinder, each opening having a characteristic shape corresponding to a character to be indicated;
   a plurality of rows of character signaling means encoded on said cylinder, each row providing a signal uniquely associated with each different shaped opening;
   sensing means responsive to said signaling means for providing successive signals corresponding to the character code from each row of signaling means as each row is rotated past said sensing means;
   light means for illuminating said openings in response to an energizing signal;
   logic means for comparing the successive signals from said sensing means with the input signal and providing an energizing signal to said light means when a predetermined correspondence occurs therebetween;
   and timing means for coupling input signals for each column of the row of characters displayed to said logic means only during the interval that the rows of character signaling means corresponding to the particular staggered column of openings to be displayed passes said sensing means.

2. Indicator means for displaying a row of characters corresponding to characters encoded on an input signal comprising:
   a rotatable opaque cylinder having a plurality of staggered columns of transparent openings arranged circumferentially about the longitudinal axis of said cylinder, each opening having a characteristic shape corresponding to a character to be indicated;
   a plurality of rows of character signaling means encoded on said cylinder in the form of ferrous and non-ferrous surfaces, each row of signaling means providing a signal which is the complement of the input signal code and is uniquely associated with each different shaped opening;
   sensing means including a row of magnetic transducers responsive to said signaling means for providing successive signals corresponding to the signal from each row of signaling means as each row is rotated past said sensing means;
   light means for illuminating said openings in response to an energizing signal;
   logic means including Exclusive OR gate circuits for comparing the successive signals from said sensing means with the input signal and providing an energizing signal to said light means when the input signal is the complement of the sensed signal;
   and timing means for coupling input signals for each column of the row of characters displayed to said logic means only during the interval that the rows of character signaling means corresponding to the particular staggered column of openings to be displayed passes said sensing means.

3. Indicator means for displaying a row of characters corresponding to characters encoded on an input signal comprising:
   a rotatable opaque cylinder having N staggered columns consisting of a set of transparent openings and a dwell space arranged circumferentially about said cylinder, wherein N is an integer greater than 1 and each opening having a characteristic shape corresponding to a character to be indicated;
   a plurality of rows of character signaling means encoded on said cylinder, each row providing a signal uniquely associated with each different shaped opening;
   sensing means responsive to said signaling means for providing successive signals corresponding to the character code from each row of signaling means as each row is rotated past said sensing means;
   light means for illuminating said openings in response to an energizing signal;
   logic means for comparing the successive signal from said sensing means with the input signal and providing an energizing signal to said light means when a predetermined correspondence occurs therebetween;
   timing means including a magnetic bar coupled to said cylinder and having at least one outer arcuate surface forming an arc of length proportional to the length of each N staggered column, N equally spaced transducers adjacent to and circumferentially disposed about the arcuate surface of said bar and a plurality of AND gate circuits, one input of each AND gate circuit being coupled to separate transducers, the remaining input being coupled to said input signal; and
   said timing means providing a plurality of timing signals for each column of the row of characters displayed to said logic means only during the interval that the rows of character signaling means corresponding to the particular staggered column of openings to be displayed passes said sensing means.

4. Indicator means for displaying a row of characters corresponding to characters encoded on an input signal comprising:

a rotatable opaque cylinder having N staggered columns consisting of a set of transparent openings and a dwell space arranged circumferentially about said cylinder, wherein N is an integer greater than 1 and each opening having a characteristic shape corresponding to a character to be indicated;

a plurality of rows of character signaling means encoded on said cylinder, each row providing a signal uniquely associated with each different shaped opening;

sensing means responsive to said signaling means for providing successive signals corresponding to the character code from each row of signaling means as each row is rotated past said sensing means;

light means for illuminating said openings in response to an energizing signal;

logic means for comparing the successive signals from said sensing means with the input signal and providing an energizing signal to said light means when a predetermined correspondence occurs therebetween;

timing means for coupling input signals for each column of the row of characters displayed to said logic means only during the interval that the rows of character signaling means corresponding to the particular staggered column of openings to be displayed passes said sensing means;

and means for displaying a second character in addition to the previous character displayed by said energizing signal in a predetermined column during each traversal of said column past said light means comprising two additional transparent openings on said drum, each additional opening having a shape corresponding to the additional character to be displayed, one additional character located at the beginning and the other at the end of each set of openings in a column separate circuit means from that for energizing the previous character displayed in the column for energizing the additional character, and circuit means responsive to the signal condition occurring when said previous character is either in the upper half or lower half of said column for energizing said light means in synchronization with only one of said two additional openings to display the additional character.

5. The apparatus of claim 4 wherein the end additional character is energized when the previously energized character occurs in the upper half of the set and the beginning additional character is energized when the previously energized character occurs in the lower half of the set and wherein the previously energized characters are digits and the odd number digits are in one half of the set and the even number digits are in the other half of the set and the additional character is a decimal point.

6. Indicator means for displaying a row of characters corresponding to characters encoded on sequential input signals, said indicator means comprising:

a rotatable opaque cylinder having a plurality of staggered columns of transparent openings arranged circumferentially about said cylinder including a draft space at the end of each column, each opening having a characteristic shape corresponding to a character to be indicated;

a plurality of rows of character signaling means encoded on said cylinder, each row providing a signal uniquely associated with each different shaped opening;

sensing means responsive to said signaling means for providing successive signals corresponding to the character code from each row of signaling means as each row is rotated past said sensing means;

light means for illuminating said openings in response to an energizing signal;

logic means for comparing the successive signals from said sensing means with the input signal and providing an energizing signal to said light means when a predetermined correspondence occurs therebetween;

and timing apparatus comprising transducer means for providing a plurality of timing signals of pulse width proportional to the length of each column of openings including the length associated with said drift space to allow for the recovery time of the light means; said timing signals occurring in time coincidence with the passage of successive columns of openings past said light means and means for gating successive input signals to the logic means when the successive signals from said transducer means are in time coincidence with corresponding successive input signals.

7. The method of encoding columns of characters on a drum wherein it is desired to display more than one character in a column comprising the steps of:

staggering the columns of characters;

encoding the additional character at the beginning and end of each column;

generating a signal representing the additional character by a separate signal corresponding to the additional character;

and illuminating the beginning character when the previously illuminated character occurs at the lower half of the column and illuminating the ending character when the previously illuminated character occurs at the upper half of the column.

8. Indicator means for displaying a row of characters corresponding to characters encoded on an input signal comprising:

a rotatable opaque cylinder having N staggered columns consisting of a set of transparent openings and a dwell space arranged circumferentially about said cylinder, wherein N is an integer greater than 1 and each opening having a characteristic shape corresponding to a character to be indicated;

a plurality of rows of character signaling means encoded on said cylinder, each row providing a signal uniquely associated with each different shaped opening;

sensing means responsive to said signaling means for providing successive signals corresponding to the character code from each row of signaling means as each row is rotated past said sensing means, each said sensing means including a permanent magnet bar, a pair of high permeability L-shaped arms extending from opposite ends of said bar, a first coil encircling one of said arms, a second coil encircling the other arm, and a pair of oppositely disposed pole pieces coupled to said L-shaped arms;

light means for illuminating said openings in response to an energizing signal;

logic means for comparing the successive signals from said sensing means with the input signal and providing an energizing signal to said light means when a predetermined correspondence occurs therebetween, said logic means including a plurality of Exclusive OR gate circuits each having two input leads and one output lead for providing an output signal when one, but not both, input leads have a predetermined input voltage level signal present, means for coupling predetermined successive sensing means signals and predetermined input signals to selected Exclusive OR gate circuits, an AND gate circuit having a plurality of input leads for providing an energizing signal when signals exceeding a predetermined voltage level are present at each input lead, and means for coupling respective output leads from said plurality of Exclusive OR gate circuits to respective AND gate circuit input leads;

and timing means including a magnetic bar coupled to said cylinder and having at least one outer arcuate surface forming an arc of length proportional to the length of each N staggered column, N equally spaced transducers adjacent to and circumferentially disposed about the arcuate surface of said bar and a plurality of AND gate circuits, one input of each AND gate circuit being coupled to separate transducers, the remaining input being coupled to said input signal.

References Cited

UNITED STATES PATENTS

| 2,633,297 | 3/1953 | Quinky et al. | 340—347 |
| 2,905,897 | 9/1959 | Gill | 340—324 |
| 3,020,531 | 2/1962 | Appleton | 340—324 |
| 3,281,820 | 10/1966 | Snider | 340—324 |
| 3,222,666 | 12/1965 | Hallden | 340—324 |
| 3,323,121 | 5/1967 | Burton et al. | 340—347 |

JOHN W. CALDWELL, *Primary Examiner.*

A. J. KASPER, *Assistant Examiner.*